United States Patent Office 3,425,502
Patented Feb. 4, 1969

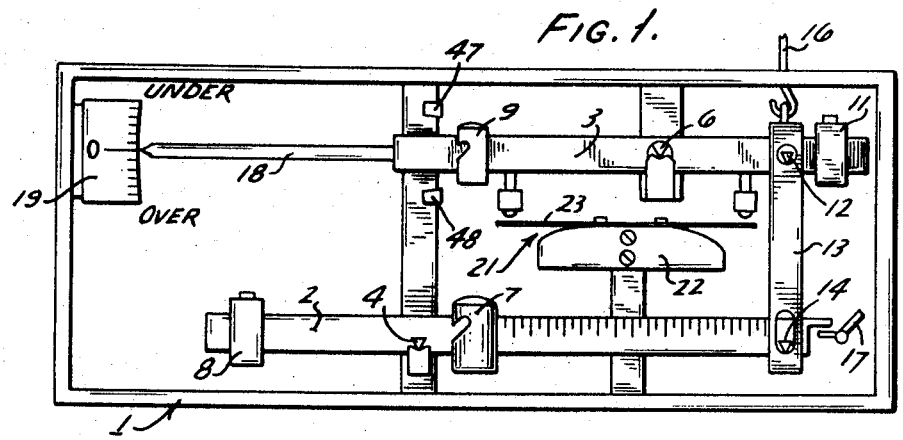

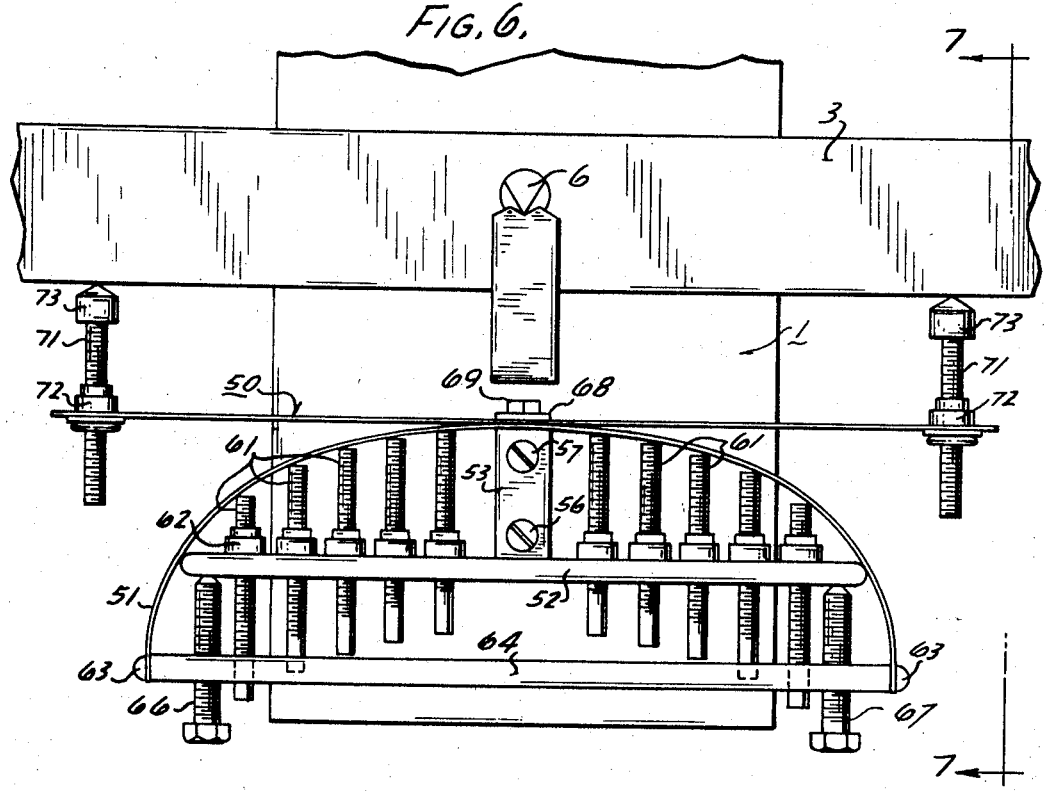
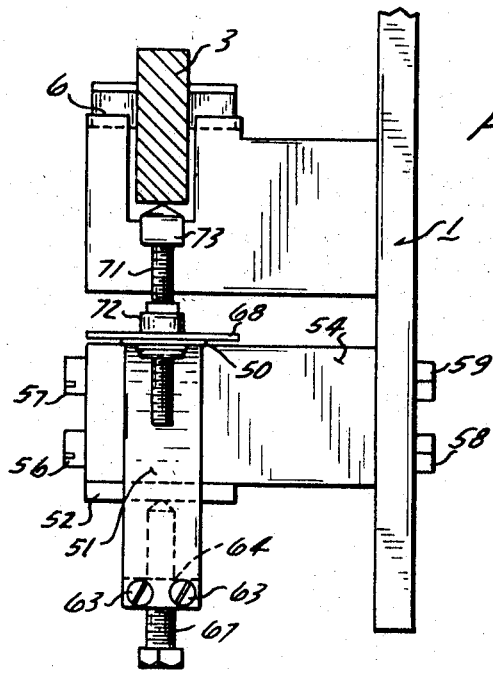

3,425,502
WEIGHING SCALE
John S. Shapland, deceased, late of Champaign, Ill., by Helen R. Shapland, executrix, Champaign, Ill., assignor to Koehring Company, Milwaukee, Wis., a corporation of Wisconsin
Filed Apr. 15, 1966, Ser. No. 542,974
U.S. Cl. 177—171          5 Claims
Int. Cl. G01g 21/10, 23/06

ABSTRACT OF THE DISCLOSURE

In an over and under type weighing scale oscillation of a scale beam in opposite directions from an equilibrated position causes alternate deflection of the opposite ends of a leaf spring against a cam block so that the scale will approach equilibrium with progressively increasing sensitivity as weight is added to or removed from the load during the weighing process.

---

The invention relates to beam type weighing scales, and it is concerned more particularly with an improved device for indicating the equilibrated condition and approximately equilibrated conditions of the scale.

In concrete batching plants and other installations where predetermined quantities of material are to be measured it is common practice to accumulate the material in a hopper which is connected by means of a weight transmitting lever system with a beam type weighing scale. The scale is equipped with an indicating device, such as a pointer playing over a graduated scale, which may be observed when the scale is zero balanced in the usual manner during loading and unloading of the hopper. In each instance, a high sensitivity of the indicating device is desirable so that an accurate amount of material can be accumulated in the hopper, and so that the material discharge from the hopper can be checked with a high degree of accuracy.

During loading of the hopper it is further desirable that the indicating device sharts moving toward zero when the amount of accumulated material in the hopper is still considerably less than the desired final quantity. Such early response of the indicating device will enable the operator of the scale and of associated material dispensing equipment to observe the progressive loading of the hopper and the gradual movement of the scale toward its balanced condition. Also, various automatic control devices, such as electric switches, can be operated from the indicating device at the proper time when the instantaneous weight of the material in the hopper differs appreciably from the weight of the predetermined quantity of material which is to be accumulated in the hopper.

Likewise, during unloading of the hopper, when the weighing beam of the scale is locked out and the indicating device gradually returns to zero, it is desirable that the indicating device starts moving appreciably before the hopper is fully discharged. An early response of the indicating device in this case permits control devices, such as electric switches, to be operated at the proper time, as for instance to change the area of the hopper discharge opening, or to operate a vibrator on the hopper.

Generally, it is an object of the invention to provide an improved beam type weighing scale with an indicating device which becomes increasingly sensitive as the scale approaches its equilibrated condition, and which is less sensitive when the scale is loaded by a quantity of material substantially different from that which is required to bring the scale into its equilibrated condition.

More specifically, it is an object of the invention to provide an improved weighing scale of the type having a weighing beam assembly, or any number of weighing beam assemblies, and a tare beam assembly, and in which an indicating device of the mentioned character is operatively connected with the tare beam assembly.

A still further object of the invention is to provide an improved weighing scale equipped with weighing and tare beam assemblies and an indicating device of the above mentioned character wherein oscillating movement of the tare beam assembly about its fulcrum center in at least one direction is resiliently opposed at a progressively increasing rate of resistance.

A still further object of the invention is to provide an improved weighing scale of the hereinabove outlined character wherein swinging movement of the tare beam assembly about its fulcrum in opposite direction is resiliently opposed at progressively increasing rates of resistance, respectively, without decreasing the sensitivity of the scale at or near its equilibrated condition.

A still further object of the invention is to provide an improved weighing scale of the above mentioned character in which the swinging movement of the tare beam assembly about its fulcrum in at least one direction is resiliently opposed at a non-uniform, progressively increasing rate of resistance.

A still further object of the invention is to provide an improved weighing scale of the above mentioned character in which the resistance to swinging movement of the tare beam assembly into the overweight range increases more rapidly than the resistance to swinging movement of the tare beam assembly into the underweight range.

A still further object of the invention is to provide a weighing scale and indicating device of the hereinabove outlined character which is relatively simple and compact in construction, efficient and reliable in operation, and which lends itself to manufacture at relatively low costs.

These and other objects and advantages are attained by the present invention, a preferred embodiment and modification of which are illustrated by the accompanying drawings; and various novel features of which are set forth by the appended claims.

In the drawings:

FIG. 1 is a schematic elevational view of a beam type weighing scale embodying the invention;

FIG. 2 is an enlarged partial view of a tare beam assembly and associated buffer units incorporated in the scale shown in FIG. 1;

FIG. 3 is an end view of parts shown in FIG 2;

FIG. 4 is a diagram illustrating the yielding characteristics of the buffer units shown in FIG. 2;

FIG. 5 is a diagram illustrating the varying sensitivity of the scale shown in FIG. 1;

FIG. 6 is an elevational view of a modified buffer unit for use in a beam type weighing scale; and FIG. 7 is an end view of parts shown in FIG. 6.

The scale as generally outlined in FIG. 1 comprises a frame structure 1 affording a support for a weighing beam assembly 2 and for a tare beam assembly 3. The weighing beam assembly 2 is fulcrumed in the support 1 in conventional manner by means of a knife edge bearing 4, and the tare beam assembly 3 is similarly fulcrumed on the support 1 by means of a knife edge bearing 6. The weighing beam assembly 2 includes the usual poise 7 and counterweight 8, and the tare beam assembly includes the usual poise 9 and counterweight 11.

Means for applying a weighing load, as from a hopper, and a compensating load from the weighing beam assembly 2 to the tare beam assembly 3 comprise a link 13 and a pull rod 16. The link 13 is pivotally connected with the tare beam assembly 3 by means of a knife edge bearing 12, and the link 13 has a lost motion connection 14 with the weighing beam assembly 2. The pull rod 16 forms part of a conventional weight transmitting lever system and is pivotally connected with the upper end of the link 13. A conventional lockout mechanism for the weighing beam assembly 2 includes an operating handle 17 which is pivoted on the support 1. By means of the lockout mechanism the weighing beam assembly 2 may be selectively coupled with or decoupled from the tare beam assembly 3 through the link 13 and lost motion connection 14.

A device for indicating the equilibrated condition and approximately equilibrated conditions of the scale comprises a pointer 18, a graduated scale 19, and buffer means generally designated by the reference character 21. The pointer 18 is secured to the tare beam assembly for swinging movement in unison therewith about the fulcrum 6. The graduated scale 19 is secured in fixed position on the support 1 and in cooperative relation to the pointer 18. The scale has a zero mark at the middle, an overweight range below the zero mark, and an underweight range above the zero mark. FIG. 1 shows the scale in a balanced condition which is indicated by the position of the pointer 18 directly opposite to the zero mark of the scale 19. Downward movement of the pointer 18 into the overweight range, as well as upward movement into the underweight range is resiliently opposed at a progressively increasing rate of resistance by operation of the buffer means 21 which are shown in detail by FIGS. 2 and 3.

The buffer means 21 comprise a cam block or saddle member 22, a leaf spring 23, and a pair of bumpers 24 and 26 at unequal distances, respectively, from the knife edge bearing 6 of the tare beam assembly 3. The cam block 22 has an elongated, generally convex surface at one side thereof, comprising a flat intermediate portion 27 which merges at its opposite ends with curved portions 28 and 29, respectively. The leaf spring 23 is secured to the intermediate portion 27 of the cam block 22 by means of cap screws 31, 32 and it presents two oppositely extending resilient arms 33, 34 in contactable relation to the convex surface portions 28 and 29, respectively, of the cam block.

A pair of cap screws 36 and 37 secure the cam block 22 to a spacer 38 (FIG. 3) which is in turn secured by cap screws 39 and 41 to the frame. As shown in FIG. 2 the cap screws 36, 37 engage the cam block 22 midway between its longitudinally opposite ends, and they are offset with respect to the knife edge bearing 6 of the tare beam toward the pointer end of the latter.

The bumpers 24 and 26 are mounted on the tare beam assembly 3 in symmetrical relation to the cam block 22, and in contactable relation to the resilient spring arms 33 and 34, respectively. The bumper 24 comprises a threaded stud 42 which is mounted in a tapped hole of the tare beam assembly 3, and which carries a forked mounting head 43 for a roller 44. Turning of the stud in its mounting hole on the beam 3 adjusts the roller 44 up and down and a nut 46 on the stud 42 is drawn up against the beam to secure the roller 44 in adjusted position. The bumper 26 is a duplicate of the bumper 24, and its roller 44 may be adjusted up and down and locked in adjusted position the same as the roller 44 of the bumper 24.

The cap screws 36, 37; spacer 38; cap screws 39, 41; and studs 42 provide means positioning the buffer means 21 in cooperative relation to the support 1 and beam 3 so that the resilient arms 33 and 34 will diverge from the adjacent portions 28, 29, respectively, of the convex saddle surface while the beam 3 is in its equilibrated position, and so that the arms will alternately be deflected against the surface portions 28, 29 of the saddle 22 by oscillation of the beam 3 in opposite directions, respectively, from its equilibrated position. The bumpers 24 and 26 provide one-way load transmitting connections between the beam 3 and the resilient arms 33, 34, respectively, of the leaf spring 23.

FIGS. 1 and 2 show the beam assembly 3 in the position which corresponds to zero balance of the scale, and from which position the beam 3 may swing about its fulcrum 6 in one direction so as to move the pointer 18 into the overweight range of scale 19, or in the other direction so as to move the pointer into the underweight range of the scale 19.

If the beam 3 swings in the direction which causes the pointer 18 to move downward from the zero mark into the overweight range of the scale 19, clearance between the roller 44 of the bumper 24 and the spring arm 33 is taken up. Thereafter, continued movement of the pointer 18 into the overweight range is yieldingly opposed by deflection of the spring arm 33 along the curved surface portion 28 of the cam block 22. The relative arrangement of the bumper 24, spring arm 33, cam block 22 and fulcrum 6 is such that after the roller 44 of the bumper 24 has moved into contact with the spring arm 33, continued movement of the beam 3 toward an overweight position will be yieldingly opposed at a progressively increasing rate of resistance.

Similarly, if the beam 3 swings in the direction which causes the pointer 18 to move upward from the zero mark into the underweight range of the scale 19, clearance between the roller 44 of the bumper 26 and the spring arm 34 is taken up. Thereafter, continued movement of the pointer 18 into the underweight range is yieldingly opposed by deflection of the spring arm 34 along the curved surface portion 29 of the cam block 22. The relative arrangement of the bumper 26, spring arm 34, cam block 22 and fulcrum 6 is such that after the roller 44 of bumper 26 has moved into contact with the spring arm 34, continued movement of the beam 3 toward an underweight position will be yieldingly opposed by a resistance which increases at a substantially uniform rate but more rapidly than the resistance which opposes the initial swinging movement of the beam 3 by which the roller 44 of the bumper 26 is brought into contact with the undeflected spring arm 34.

FIG. 4 shows the deflection characteristic A of the buffer unit comprising the spring arm or resilient abutment 33 and bumper 24, and the deflection characteristic B of the buffer unit comprising the spring arm or resilient abutment 34 and the bumper 26. The zero point on the abscissa of the diagram corresponds to the zero point of the graduated scale 19 in FIG. 1, and the ordinate values of the diagram represent the resistances which oppose movement of the pointer 18 into the overweight and underweight ranges of the scale. It will be seen that initial movement of the pointer into the overweight range is steadily opposed by a uniformly increasing resistance, and that continued movement of the pointer beyond 1.2 inches from the zero point is opposed by a non-uniformly increasing resistance, the rate of resistance increase during movement beyond 1.2 inches from the zero point increasing much more rapidly than during the initial 1.2 inch movement of the pointer. The yielding characteristic of the spring arm or resilient abutment 33 is non-linear within the overweight range of the scale 19.

It will further be noted from the diagram of FIG. 4 that initial movement of the pointer 18 into the underweight range is steadily opposed by a uniformly increasing resistance equal to the resistance which opposes initial movement of the pointer into the overweight range. Continued movement of the pointer beyond 1.2 inches from the zero point into the underweight range is opposed by a progressively increasing resistance at a generally uniform rate. The rate of resistance increase during movement of the pointer beyond 1.2 inches from the zero point into the underweight range is substantially higher than the rate of resistance increase during the initial pointer movement in either direction, but lower than the rate of resistance increase during movement of the pointer beyond 1.2 inches over the overweight range. The yielding characteristic of the spring arm or resilient abutment 34 is substantially linear within the underweight range of the scale 19.

The diagram of FIG. 5 illustrates the varying sensitivity of the scale shown in FIG. 1. The zero point on the abscissa in FIG. 5 corresponds to the zero point of the graduated scale 19 in FIG. 1, and the ordinate values in FIG. 1 represents sensitivities expressed by inches of pointer movement per gram of load change. It will be noted that the sensitivity of the pointer is highest in the vicinity of the zero point, that is, within a range of 1.2 inch pointer movement from the zero mark in either direction. As the pointer swings beyond 1.2 inches from the zero point into the overweight range, its sensitivity decreases rapidly at a non-uniform rate and approaches a minimum value at maximum deflection of the pointer. Likewise, as the pointer swings beyond 1.2 inches from the zero point into the underweight range its sensitivity decreases rapidly. However, the sensitivity decrease in the underweight range is less rapid than in the overweight range, and the minimum sensitivity at the end of the underweight range is somewhat greater than the minimum sensitivity at the end of the overweight range.

When the scale shown in FIG. 1 is used in a cement batching plant or similar installation, for measuring a predetermined amount of material, the scale is first zero balanced in the usual manner while the hopper, not shown, is empty. The poise 7 is then moved to the proper weighing point on the weighing beam assembly 2 and as a result the pointer 18 will swing upward to the end of the underweight range of the graduated scale 19. Such swinging movement is limited by a suitable stop, for instance as shown at 47 in FIG. 1. Due to the relatively low sensitivity of the pointer at the upper end of the underweight range, the pointer will start moving toward the zero point of the scale when the amount of material accumulated in the hopper is still considerably less than the full amount which is required to bring the scale into balance at the selected positioning of the poise 7.

As loading of the hopper continues the pointer 18 progresses toward the zero mark, and as it does so it becomes more and more sensitive to load changes in the hopper. Conventional control devices, not shown, such as electric switches, may be operated by the tare beam assembly 3 as the pointer 18 approaches the zero mark of the scale 19, the purpose of such control device being, for instance, to reduce the rate of material discharge into the hopper, before it is shut off entirely.

Shortly before the pointer 18 reaches the zero mark on the scale 19 during loading of the hopper, it has attained its highest sensitivity to load changes in the hopper. Accordingly, material discharge into the hopper may be cut off with a high degree of accuracy at the moment when the predetermined quantity of material has been accumulated in the hopper.

Before the hopper is unloaded, the weighing beam assembly 2 is decoupled from the tare beam assembly 3 by means of the handle 17. As a result, the pointer 18 will swing downward to the end of the overweight range of the graduated scale 19. Again, such swinging movement is limited by a suitable stop, as shown for instance at 48 in FIG. 1. Due to the relatively low sensitivity of the pointer at the lower end of the overweight range, the pointer will start moving upward toward the zero point of the scale when a quantity of material considerably less than the total accumulated quantity has been unloaded from the hopper.

As unloading of the hopper continues, the pointer 18 progresses upward toward the zero mark, and as it does so it becomes more and more sensitive to load changes in the hopper. Conventional control devices, not shown, such as electric switches, may be operated by the tare beam 3 as the pointer 18 approaches the zero mark of the scale 19 during unloading of the hopper. Such control devices may be provided, for instance, to change the area of the hopper discharge opening, or to operate a vibrator on the hopper during the final part of the hopper unloading operation.

Movement of the pointer 18 into exact registry with the zero mark of the scale 19 at the end of the hopper unloading operation, signifies complete discharge of the hopper. Due to the high sensitivity of the pointer in the vicinity of the zero mark, any discrepancy between the accumulated and unloaded quantities of material may be detected with a high degree of accuracy.

FIGS. 6 and 7 illustrate a modification of the buffer means 21 shown in FIGS. 1, 2, and 3. Like the buffer means 21, the modified buffer means comprise a leaf spring 50, which is operatively associated with the tare beam assembly 3 so as to resiliently oppose swinging movement of the tare beam assembly out of its equilibrated position. A convex seating surface for the spring 50 is provided by a flexible steel strap 51 which is adjustably mounted on a bar 52. Midway between its ends the bar 52 is connected, as by welding, to a block 53 which is in turn secured to the front end of a spacer 54 by bolts 56, 57. At its rear end the spacer 54 is secured to the support 1 by bolts 58, 59.

The bar 52 mounts a series of ten supporting studs 61 for the steel strap 51, each stud having a jam nut 62 for locking it in adjusted position. The opposite ends of the strap 51 are secured by screws 63 to the opposite ends, respectively, of a bridge member 64 which extends below the bar 52 in longitudinal direction of the latter. Cap screws 66 and 67 at opposite ends of the bridge member 64 bear against the under side of the bar 52, the screws 66, 67 being drawn up against the bar 52 to tension the strap 51 so that it will bear against the free ends of the studs 61 and the opposite rounded ends of the bar 52.

The leaf spring 50 is clamped midway between its ends upon the portion of the strap 51 on top of the block 53 by means of a cover plate 68 and bolts 69. One-way load transmitting means are operatively interposed between the tare beam assembly 3 and the opposite ends of the leaf spring 50 at equal distances from the fulcrum 6 of the tare beam assembly 3. Such load transmitting means are afforded, at each end of the leaf spring 50 by a threaded stud 71 adjustably mounted in a collar 72 on the leaf spring 50. A pointed head 73 at the upper end of the stud 71 is engageable with the under side of the tare beam assembly.

It will be noted that the flexible strap 51 may be deformed by adjustment of the studs 61 and cap screws 66, 67 so as to vary the profile of the concave seating surface for the leaf spring 50. If the scale is used on mobile or portable equipment in more than one state, different specifications applicable to over travel and under travel of the indicator may be taken care of by adjustment of the studs 61 and cap screws 66, 67.

It is claimed and desired to be secured by Letters Patent:

1. In a weighing scale, the combination of a support, a weighing beam assembly and a tare beam assembly separately fulcrumed on said support, link means for applying a weighing load and a compensating load from said weighing beam assembly to said tare beam assembly; indicator means operatively connected with said tare beam assembly for actuation thereby; a saddle member presenting an elongated, generally convex, surface at one side thereof; a leaf spring secured intermediate its ends to a mid-portion of said saddle member and presenting a pair of oppositely extending resilient arms in contactable relation to convex surface portions, respectively, of said saddle member, means securing said saddle member to said support so as to present said leaf arms in confronting relation to said tare beam assembly at opposite sides, respectively, of the fulcrum of the latter; and load transmitting means operatively interposed between said tare beam assembly and said leaf arms, respectively.

2. The combination of elements set forth in claim 1, wherein said load transmitting elements are mounted on said tare beam assembly in vertically adjustable relation thereto.

3. In a weighing scale, the combination of a support; a weighing load transmitting mechanism including a beam element fulcrumed on said support for oscillating movement into and out of an equilibrated position; indicator means operatively connected with said beam element for actuation thereby; buffer means comprising a saddle member presenting an elongated, generally convex, surface at one side thereof; a leaf spring secured intermediate its ends to a mid-portion of said saddle member and presenting a pair of oppositely extending resilient arms in contactable relation to adjacent portions, respectively, of said convex saddle surface; and means positioning said buffer means in cooperative relation to said support and beam element so that said resilient arms will diverge from said adjacent portions, respectively, of said convex saddle surface while said beam element is in said equilibrated position, and so that said arms will alternately be deflected against said adjacent portions of said saddle surface by oscillating movements of said beam element in opposite directions, respectively, from said equilibrated position.

4. The combination set forth in claim 3 wherein said saddle member is fixedly secured to said support; and one-way load transmitting connections operatively interposed between said beam element and said resilient arms, respectively, of said leaf spring.

5. The combination of elements set forth in claim 3, wherein said saddle member comprises a bar element, a series of studs adjustably secured to said bar element in transversely extending relation thereto, a flexible strap member bearing upon the free ends of said studs, and fastening means adjustably connecting the opposite ends of said strap member with said bar element.

References Cited
UNITED STATES PATENTS

| | | | |
|---|---|---|---|
| D. 99,239 | 4/1936 | Jacobus | 177—247 XR |
| 2,692,772 | 10/1954 | Hadley | 177—188 |

RICHARD B. WILKINSON, *Primary Examiner.*

L. HAMBLEN, *Assistant Examiner.*

U.S. Cl. X.R.

177—184, 246